May 1, 1945. A. FLOHR ET AL 2,374,988
GUARD FOR EMERY WHEELS AND THE LIKE
Filed Nov. 19, 1943
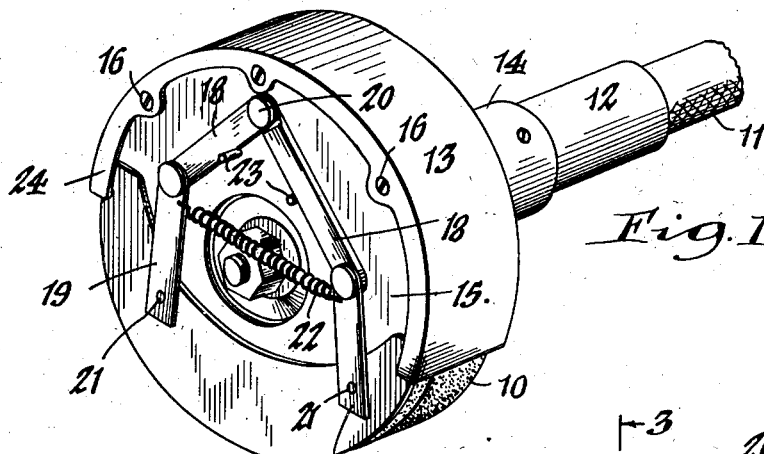
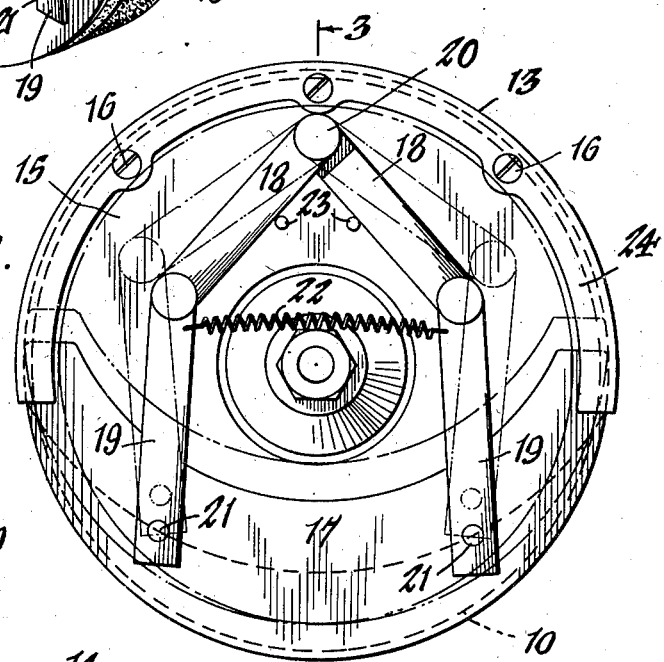
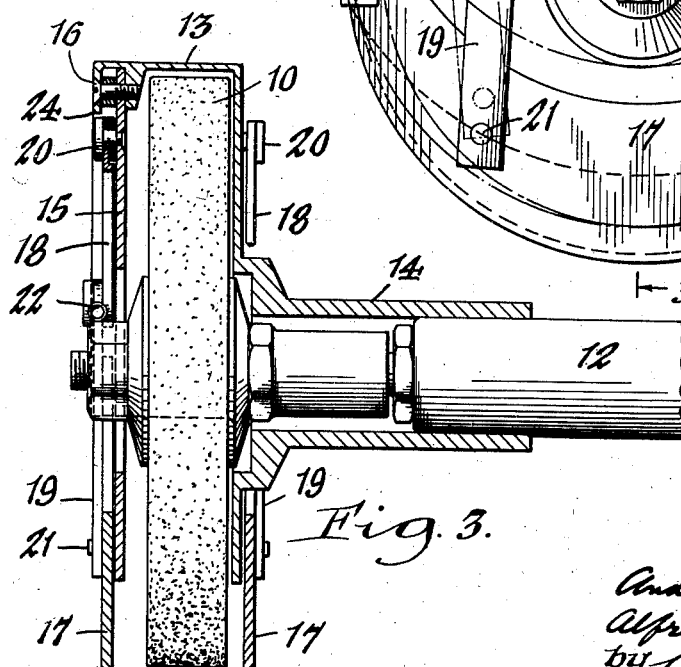

Patented May 1, 1945

2,374,988

UNITED STATES PATENT OFFICE 2,374,988

GUARD FOR EMERY WHEELS AND THE LIKE

Andrew Flohr and Alfred J. Flohr, Buffalo, N. Y.

Application November 19, 1943, Serial No. 510,896

7 Claims. (Cl. 51—269)

This invention relates generally to certain useful improvements in protective guards for emery wheels, saws and other tools, but more particularly to a guard for portable tools of this character.

It has for one of its objects to provide a protective guard for rotary tools, such as emery wheels and the like, which is so designed and constructed as to afford maximum protection to the operator at all times and so enshroud the rotating tool that should it break while in use, the broken fragments will be deflected away from the operator and prevented from flying toward him.

Another object of the invention is to provide a safety guard which is full-floating in action and is automatically responsive to relative displacement as the tool wears and which is self-adjustable for displacement by the work from any radial point of the rotating tool within certain limits.

Other features of the invention reside in the construction and arrangement of parts hereinafter described and particularly pointed out in the appended claims.

In the accompanying drawing:

Figure 1 is a perspective view of the guard constituting our invention. Figure 2 is a front view thereof. Figure 3 is a vertical section taken on line 3—3, Figure 2.

Similar characters of reference indicate corresponding parts throughout the several views.

By way of example, our invention has been shown in connection with a portable tool consisting of an enemy wheel 10 attached to a shaft 11 extending through a tube 12 which serves as a handle for the manipulation of the tool by the operator. Disposed substantially over the upper half of the wheel to enclose the periphery and opposite sides thereof is a fixed guard section or hood 13 having an attaching sleeve 14 projecting axially from the rear side thereof for detachable sliding engagement with the shaft-engaging tube 10. The front wall 15 of this guard section is removable to permit the assembly of the latter over the wheel and the same may be secured in place by screws 16 or like fastenings. This hood leaves the lower portion of the wheel exposed for operative engagement with the work but does not afford complete protection to the operator, and should the wheel break while in use the wheel-fragments will be obviously thrown out in any and all directions with the possibility of serious injury to the operator. To guard against such a condition and insure maximum protection to the operator, we provide movable or displaceable guard means which are disposed over the exposed lower sides of the emery wheel and which are self-adjustable by contact with the work for universal displacement in planes parallel to the rotating wheel so that at all times such wheel is completely enshrouded and the possibility of injury to the operator from flying fragments is reduced to a minimum.

These displaceable guard means consist of side plates or walls 17 which are mounted or suspended on the opposite sides of the fixed guard section 13 to normally assume a position concentric with the wheel or like revolving tool to extend slightly beyond the periphery thereof and yet being free to respond in full-floating fashion to be displaced inwardly in any radially angular direction as determined by the contact of the work with the peripheral edges thereof. These displaceable side plates are mounted independently of the other in the same manner and a description of one will suffice for both. Each plate 17 is substantially of arcuate or semi-circular shape, being recessed midway of its upper edge to clear the wheel-shaft or hood sleeve 14 while its outer edge is of a contour concentric with the wheel. Two sets of companion link means 18, 19 serve to suspend the plate from the fixed guard section for universal displacement in a plane parallel to the wheel, the upper links 18 being pivoted at their upper ends to a common central pivot 20 applied to the corresponding side wall of said guard section while the free ends of the lower links 19 are pivoted at 21 to the displaceable guard plate 17 at opposite sides of the wheel axis, the lower links being normally diverging downwardly. A spring 22 connected across the two sets of links serves to yieldingly resist inward displacement of the guard plate and tends normally to urge the latter outwardly to a position extended beyond the periphery of the wheel 10. Stop pins 23 projecting from the side wall of the guard section 13 in the inward moving path of the opposing links 16 limit the extensible movement of the two sets of links and the outward displacement of the guard wall 17.

During its displaceable or full-floating movement, each guard plate is confined during such movement within a predetermined circumference, and for this purpose its opposite side marginal edges are guided in an arcuate guideway 24 formed on the companion side wall of the fixed guard section 13. By this construction, as the emery wheel is brought at any one of a plurality of given radial points in contact with the work to be operated upon, the suspended guard plates 17 are simultaneously deflected or displaced inwardly until the adjoining portion of their peripheral edges are flush with the working face of the wheel while the upper side edges thereof are properly confined in the companion guideways 24.

While manifestly simple, compact and inexpensive in construction, this protective guard is self adjustable and assures at all times maximum protection to the operator should the emery wheel accidentally break while in use. Furthermore, as the wheel wears during use, the guard adapts itself thereto.

We claim as our invention:

1. A protective guard for rotating tools, comprising a housing extending part way over the periphery and opposite sides of the tool, a movable guard wall mounted on said housing in overlying relation to one of the exposed sides of the tool and having its outer edge substantially concentric with that of the tool, and a flexible means for connecting said guard wall with the housing to permit a displacement of such wall in a plane parallel to the plane of rotation of the wheel, said flexible means including a spring for normally urging the same in a direction for displacing the guard wall beyond the periphery of the tool.

2. A protective guard for rotating tools, comprising a housing extending part way over the periphery and opposite sides of the tool, a movable guard wall mounted on said housing in overlying relation to one of the exposed sides of the tool and having its outer edge substantially concentric with that of the tool, a flexible means for connecting said guard wall with the housing to permit a displacement of such wall in a plane parallel to the plane of rotation of the wheel, a spring connected to said flexible means for normally urging the same in a direction for displacing the guard wall beyond the periphery of the tool, and stop means for limiting such displacement of such parts beyond a predetermined position.

3. A protective guard for rotating tools, comprising a substantially semi-circular housing extending part way over the periphery and opposite sides of the tool and having guideways at the opposite sides thereof adjacent its periphery, movable guard walls applied to opposite sides of the housing in overlying relation to the exposed sides of the tool and guided at its opposite edges in the companion housing guideways for relative displacement in planes parallel to the rotating plane of the tool, and tensioned suspension means connecting each guard wall to the housing for normally urging such wall in a direction for displacing the same beyond the periphery of and in concentric relation with the tool and permitting inward displacement thereof from any radial angle when the tool is brought into operative engagement with the work.

4. A protective guard for rotating tools, comprising a substantially semi-circular housing extending part way over the periphery and opposite sides of the tool, and having guideways at the opposite sides thereof adjacent its periphery, movable guard walls applied to opposite sides of the housing in overlying relation to the exposed sides of the tool and guided at its opposite edges in the companion housing guideways for relative universal displacement in planes parallel to the rotating plane of the tool, and link means pivotally connecting each guard wall in suspension from the housing and including a spring for normally urging such wall in a direction beyond the periphery of and in concentric relation with the tool and stops for limiting such displacement of said wall.

5. A protective guard for rotating tools, comprising a substantially semi-circular housing extending part way over the periphery and opposite sides of the tool and having guideways adjacent its periphery and a sleeve projecting axially from one of the sides thereof for detachably connecting the housing to the tool, movable guard walls peripherally guided in said housing guideways in overlying relation to those portions of the tool exposed beyond the housing and adapted for universal displacement relative thereto in planes parallel to that of the rotating tool, and flexible means for connecting the respective guard walls with the housing to permit their displacement relative thereto, each of said flexible means including link members, a spring connected thereto for yieldingly resisting inward movement of the companion guard wall from any radial direction and stops for limiting the outward movement of such guard wall.

6. A protective guard for rotating tools, comprising a housing extending part way over the periphery and opposite sides of the tool, a movable guard wall mounted on said housing in overlying protective relation to an exposed side of the tool for relative displacement in a plane parallel to the rotating tool, and suspension means connecting said guard wall to the housing for normally urging such wall outwardly to a predetermined position relative to the tool and permitting inward displacement thereof from any radial angle when the tool is brought into operative engagement with the work.

7. In a protective guard of the character described, a side plate adapted for suspension from a rotating tool housing to overlie the exposed side of the tool, and suspension means therefor including two sets of links pivoted at their lower ends to said plate and joined at their upper ends to a common pivot adapted for connection to said housing.

ANDREW FLOHR.
ALFRED J. FLOHR.